US012617173B2

(12) United States Patent
Strasser

(10) Patent No.: US 12,617,173 B2
(45) Date of Patent: May 5, 2026

(54) METHOD FOR MANUFACTURING THREE-DIMENSIONAL PRODUCTS FROM A FIBER-CONTAINING MATERIAL USING AT LEAST ONE FORMING TOOL AND FORMING TOOL

(71) Applicant: Kiefel GmbH, Freilassing (DE)

(72) Inventor: Josef Strasser, Staudach (DE)

(73) Assignee: Kiefel GmbH, Freilassing (DE)

( * ) Notice: Subject to any disclaimer, the term of this patent is extended or adjusted under 35 U.S.C. 154(b) by 70 days.

(21) Appl. No.: 18/741,984

(22) Filed: Jun. 13, 2024

(65) Prior Publication Data

US 2024/0416611 A1 Dec. 19, 2024

(30) Foreign Application Priority Data

Jun. 16, 2023 (DE) ..................... 10 2023 115 817.1

(51) Int. Cl.
*B30B 11/02* (2006.01)
*B31D 5/02* (2017.01)

(52) U.S. Cl.
CPC .............. *B31D 5/02* (2013.01); *B30B 11/022* (2013.01)

(58) Field of Classification Search
CPC ............... B30B 11/022; B29C 35/0261; B29C 2043/3266; B29C 2043/3636
See application file for complete search history.

(56) References Cited

U.S. PATENT DOCUMENTS 3,899,281 A * 8/1975 Jakobs .................. B30B 11/022 425/432
5,783,230 A * 7/1998 Toet ...................... B30B 11/022 100/231
6,008,113 A * 12/1999 Ismail ............... H01L 21/67092 438/455
6,054,079 A * 4/2000 Toet ........................ B28B 3/022 425/432
6,149,844 A * 11/2000 Graham .................. B29C 70/44 425/389
2006/0220273 A1* 10/2006 Armstrong .............. B29C 43/18 425/398

(Continued)

FOREIGN PATENT DOCUMENTS

CN 215320777 U 12/2021
DE 23 16 250 A1 10/1974

(Continued)

OTHER PUBLICATIONS

German Search Report in DE Appl. No. 10 2023 115 817.1 mailed Feb. 19, 2024, 4 pages.

(Continued)

*Primary Examiner* — Andrew D Graham
(74) *Attorney, Agent, or Firm* — Kowert, Hood, Munyon, Rankin & Goetzel, P.C.; Gareth M. Sampson; Dean M. Munyon

(57) ABSTRACT

A method for manufacturing three-dimensional products with at least one inclined product portion made of a fiber-containing material using at least one forming tool and a forming tool are described. Vibrations are introduced via a device and this results in an improved compression of fiber-containing material in the region of inclined portions.

11 Claims, 3 Drawing Sheets

(56) References Cited

U.S. PATENT DOCUMENTS

| | | | | |
|---|---|---|---|---|
| 2009/0295013 | A1* | 12/2009 | Luo | B29C 43/56<br>264/234 |
| 2015/0129111 | A1* | 5/2015 | Arold | B29C 65/088<br>156/580.2 |
| 2015/0151486 | A1* | 6/2015 | Dahl | B29C 70/42<br>156/443 |
| 2015/0300389 | A1 | 10/2015 | Mayer et al. | |
| 2020/0156305 | A1* | 5/2020 | Wabnig | B29C 51/428 |
| 2021/0394405 | A1* | 12/2021 | Erceg | B29C 33/308 |

FOREIGN PATENT DOCUMENTS

| | | | |
|---|---|---|---|
| DE | 102 14 626 | A1 | 10/2003 |
| GB | 2 246 095 | A | 1/1992 |
| WO | 94/04335 | A1 | 3/1994 |
| WO | 2023/094272 | A1 | 6/2023 |

OTHER PUBLICATIONS

Extended European Search Report in Appl. No 24180648.8 mailed Jan. 14, 2025, 11 pages.

* cited by examiner

METHOD FOR MANUFACTURING THREE-DIMENSIONAL PRODUCTS FROM A FIBER-CONTAINING MATERIAL USING AT LEAST ONE FORMING TOOL AND FORMING TOOL

PRIORITY CLAIM

The present application claims priority under 35 U.S.C. § 119 to German Patent Application No. DE 10 2023 115 817.1, filed Jun. 16, 2023, the disclosure of which is incorporated by reference herein in its entirety.

TECHNICAL FIELD

Methods for manufacturing three-dimensional products with at least one inclined product portion made of a fiber-containing material using at least one forming tool, and a forming tool, are described.

DESCRIPTION OF RELATED ART

Products made from fiber-containing material can be used, for example, as packaging for food (e.g. bowls, capsules, boxes, lids, etc.) and consumer goods (e.g. electronic devices, etc.) as well as beverage containers. Furthermore, such products can also be used for everyday goods, such as disposable cutlery and tableware. Fiber-containing materials contain natural fibers or artificial fibers. Recently, fiber-containing material is increasingly used that has or is made of natural fibers that can be obtained, for example, from renewable raw materials or waste paper.

BACKGROUND

When molding products from a fiber-containing material, the fiber-containing material is pressed between the forming surfaces of a forming tool. During pressing, the products are heated and strongly compressed. In particular, during manufacturing of products from a fiber-containing material in a so-called “dry fiber” manufacturing process, where relatively dry fiber material is processed, difficulties arise for pressing at inclined portions of the products. Inclined product portions are inclined relative to a main axis in the pressing direction, usually the vertical axis, of a product. The term “dry fiber” is generally used when the moisture content of the fiber-containing material is between approximately 0.1 and 60 wt. %, preferably between 5 and 30 wt. %.

The pressing force acts linearly and/or vertically via the forming tool halves in the direction of the product base, where the pressing force on the product walls decreases depending on the inclination. The steeper the product walls are compared to the product base, the lower the pressing force acting on the product walls. Due to the lower pressing force, poorer compression occurs, where the mechanical properties (e.g. strength) of the product to be manufactured are significantly worse than those of the product base. In addition, the surface properties of the product walls suffer.

So far, attempts have been made to counteract the problem by using flexible tools with an inflatable inner tool (“balloon”).

However, flexible tools have the disadvantage that the inflatable inner tool, which must be made of a flexible material, can provide significantly poorer heat transfer, so that the product properties on the surface, and in terms of mechanical properties, are worse than with products manufactured using fixed tools without flexible inner tools.

SUMMARY

Object

In contrast thereto it is an object of the present disclosure to provide a solution for the manufacture of products from a fiber-containing material that eliminates the disadvantages of the prior art, where products can be produced with consistent quality and mechanical properties over the entire product geometry. In particular, it is an object to provide such a solution for fiber-containing material that is pressed in a so-called “dry fiber” processing.

Solution

The above-mentioned object is achieved by a method for manufacturing three-dimensional products with at least one inclined product portion, made of a fiber-containing material, using at least one forming tool, where the at least one forming tool has at least one first tool component with at least one cavity and at least one second tool component with at least one mold part corresponding to the at least one cavity, where the at least one mold part and the at least one cavity are movable relative to one another to form a mold cavity between corresponding surfaces of the at least one cavity and the at least one mold part, including the following steps:

- introducing a fiber-containing material into at least one cavity of at least one first tool component,
- closing the forming tool by means of a relative displacement of the at least one first tool component and the at least one second tool component,
- pressing the fiber-containing material within the mold cavity, and
- introducing vibrations by moving the at least one first tool component and/or the at least one second tool component relative to the pressing direction during the pressing.

By introducing vibrations relative (perpendicular, parallel or another optimal direction of action) to the pressing direction, the fiber-containing material is repeatedly moved between the inner and outer tool and thus “squeezed”, so that the fiber-containing material is compressed in the same way as it is within a portion on which the pressing force is able to act over the entire surface, such that the strength is also increased on inclined surfaces of a product and the surface properties can be created in the same way as on the remaining surfaces of the product.

The vibrations of the inner and outer tools are transmitted via the surfaces of the cavity and the mold part to the fibers of the fiber-containing material, so that they move continuously and no voids are created in the material.

This makes it possible to press three-dimensional products that have at least one inclined product portion, with homogeneous strength and surface properties in a fixed tool without flexible tool components.

In further embodiments, the vibrations can be introduced via the at least one mold part. This means that the vibrations are introduced from an inner forming tool part, which can be advantageous for rotationally symmetrical products because the vibrations can be evenly distributed over the surface and introduced to inclined side walls, etc. Finally, in further embodiments, the vibrations can also be introduced via the cavity, i.e. an outer forming tool part. In still further embodiments, vibrations can be introduced via both an inner forming tool part (mold part) and an outer forming tool part (cavity), so that the fibers can be more strongly compressed in the region of inclined product portions, since vibrations are introduced into the material (fibers) from both sides in the mold cavity in the region of inclined product portions.

In further embodiments, the frequency of the vibrations can be modified during the pressing. This can influence the compression of the fibers and thus the strength of the product. For example, the frequency can increase or decrease during the pressing. This makes it possible, for example, to control the compression because the fibers become more compact with increasing frequency.

In other embodiments, the vibration duration and the duration of the pressing process can be different. In such embodiments, vibrations are not introduced into the material throughout the entire pressing process. For example, pre-pressing can initially be carried out without introducing vibrations. In further embodiments, even after the introduction of vibrations, after the fibers have been compressed by the introduction of vibrations and pressed by pressure, the pressing process can be maintained and the fibers and/or the material of the product can be re-pressed. The pressure during a re-pressing process can be greater or lesser than the pressure in the pressing process during the introduction of vibrations. In other embodiments, for example, vibrations can be introduced before a pressing process, thereby achieving an improved distribution of fibers of the inserted fiber material.

In other embodiments, the pressing pressure can be modified during the pressing. This pressure can be modified both when vibrations are introduced and during a re-pressing process. The pressure can be modified in particular according to the vibrations introduced; as such, for example, the pressure can be increased successively. In further embodiments, it is intended to continuously change the pressure in order to adapt the compression of the fibers in conjunction with the introduced vibrations to ensure optimal pressing, in order to achieve specified strength values.

In further embodiments, the frequency of the vibrations and/or the duration of the vibrations can be adapted to the pressing pressure. This allows both the pressure and the frequency and/or vibration duration to be adjusted, in particular according to the product geometry and the material of the fibers, e.g. with regard to their properties and embodiment (length, diameter, orientation). For example, at the beginning of a pressing process, the pressure may not yet have reached its maximum, so that the mold cavity and in particular the distance between the opposing mold surfaces of the cavity and the mold part in the region of inclined product portions is larger than at maximum pressure. The frequency of the vibrations can, for example, also be lower than the frequency of the vibrations at maximum pressure. This improves the compression of the fibers, as they can continuously compact. This also helps to prevent defects in finished, inclined product portions.

In further embodiments, the vibrations can be introduced in a plane perpendicular or parallel, or in an optimized direction of action, to the pressing direction by a linear or rotating movement. The type of introduction can depend on the design and geometry of the products, which determines the type of vibrations introduced for optimal compression. For example, a rotating movement can be advantageous for rotationally symmetrical products, whereas linear movements can be advantageous, for example, when products have radially protruding elements or, for example, have a polygonal cross-section. In further embodiments, it is possible to switch between a linear and a rotating movement to introduce vibrations during a pressing process, which further improves compression because the fibers can be moved additionally, or differently, in a different type of vibration and can thus occupy free spaces.

In further embodiments, the vibrations can be introduced according to the geometry of the product to be manufactured. This allows the compression to be adapted to the given geometry.

During the pressing process, the introduced material and/or the fibers can be heated via the forming tool, where the first tool component and/or the second tool component can be heatable and include a heat-conducting material. In even further versions, the pressure as well as the vibration duration and frequency can be adapted according to the tool and pressing temperature.

The above-mentioned object is also achieved by a forming tool for manufacturing three-dimensional products from a fiber-containing material, including at least one first tool component with at least one cavity and at least one second tool component with at least one mold part corresponding to the at least one cavity, where the at least one mold part and the at least one cavity can be moved relative to one another to form a mold cavity between corresponding surfaces of the at least one cavity and the at least one mold part, and can be pressed to press a fiber-containing material that can be inserted into the mold cavity, further including a device for introducing vibrations by moving the at least one first tool component and/or the at least one second tool component perpendicular to the pressing direction during the pressing.

The forming tool enables the manufacture of products as described above and can implement the above methods by appropriate activation and modification of pressure, frequency, vibration duration and temperature.

Further features, embodiments and advantages result from the following illustration of exemplary embodiments with reference to the figures.

DETAILED DESCRIPTION

Various embodiments of the technical teaching described herein are shown below with reference to the figures. Identical reference signs are used in the figure description for identical components, parts and processes. Components, parts and processes that are not essential to the technical teachings disclosed herein or that are obvious to a person skilled in the art are not explicitly reproduced. Features specified in the singular also include the plural unless explicitly stated otherwise. This applies in particular to statements such as “a” or “one”.

The figures show exemplary embodiments of apparatuses for manufacturing products from a formable material, where the exemplary embodiments shown do not constitute a limitation with regard to further embodiments and modifications of the described embodiments.

Figure 1:
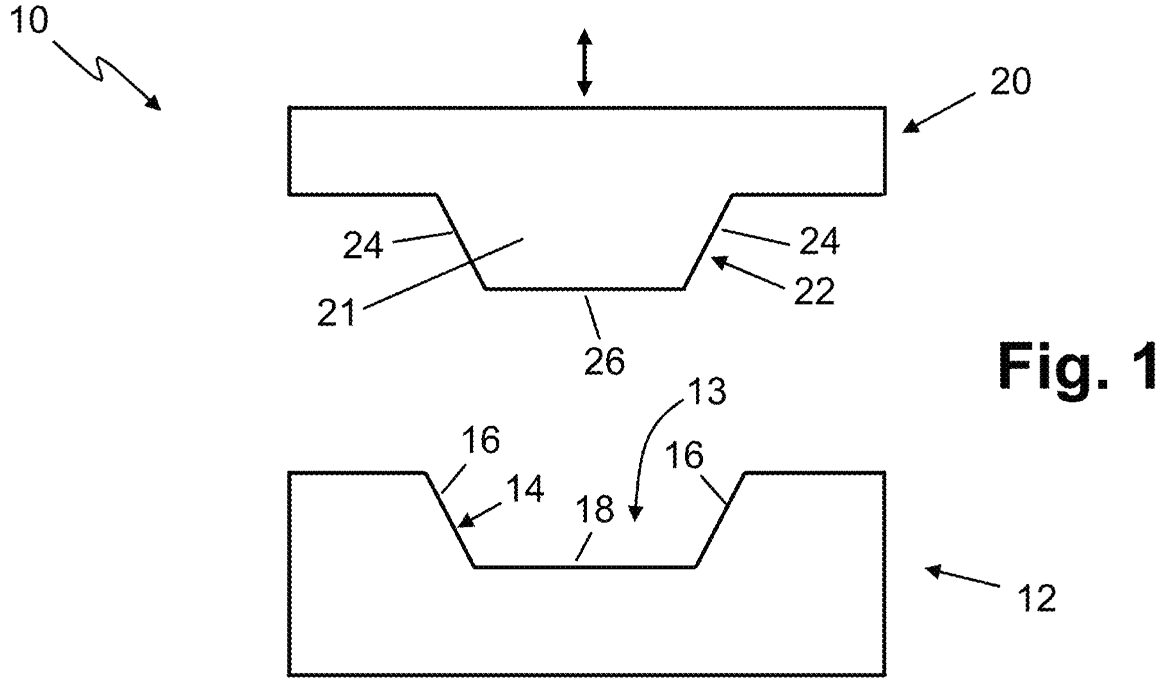
FIG. 1 depicts a schematic illustration of a forming tool for manufacturing products from a fiber-containing material, according to some embodiments.

FIG. 1 is a schematic illustration of a forming tool 10 for manufacturing products from a fiber material. The forming tool 10 can be part of a molding plant 100, as shown below with reference to FIG. 5. The forming tool 10 has a first tool component 12. The first tool component 12 includes a tool material for the manufacture of products from a fiber-containing material, and has corresponding properties, in particular with regard to strength and thermal conductivity. A second tool component 20 of the forming tool 10 can include the same material and have the same properties as the first tool component 12. Heating devices can be provided in the first tool component 12 and/or the second tool component 20, which bring the tool components 12, 20 to a temperature required for pressing fiber-containing material. Usually, the pressing of fiber-containing material takes place at temperatures in the range of 20 to 300° C., ideally from 100-200° C. In addition, the tool components 12, 20 are pressed under high pressure in the range of 100 $N/cm^2$ to 5,000 $N/cm^2$, ideally from 250 $N/cm^2$ to 1,000 $N/cm^2$ specific surface load. For this purpose, the forming tool 10 can be operatively connected to pressing devices, such as a toggle press. The toggle press can be part of a molding plant 100. The forming tool 10 can be interchangeably connected to the toggle press of the molding plant 100, so that different products can be manufactured using the molding plant 100 by changing the forming tool.

The first tool component 12 has at least one cavity 13, the surface 14 of which represents the external geometry of a product to be manufactured. The cavity 13 has a mold bottom 18 and slopes 16 extending laterally upwards from the mold bottom 18. The angle between the mold bottom 18 and the slopes 16 can, for example, be between 91° and 179°. In most embodiments of products, such as cups, bowls, etc., a mold bottom 18 has an angle of 91° to 105° with respect to lateral slopes 16.

In further embodiments, the first tool component 12 can have a plurality of cavities 13 that extend flatly over the first tool component 12.

The second tool component 20 has at least one mold part 21 arranged corresponding to the at least one cavity 13 of the first tool component 12, which is immersed in the cavity 13 when the forming tool 10 is closed. The mold part 21 has a surface 22 that is formed corresponding to the surface 14 of the cavity 13. The surface 22 extends over a mold part bottom 26, which in the embodiment shown is aligned parallel to the mold bottom 18. In the closed state of the forming tool 10, slopes 24 of the mold part 21 are opposite the slopes 16. In the closed state of the forming tool 10, a mold cavity 11 is formed between the surface 14 of the at least one cavity 13 and the surface 22 of the mold part 21. In the mold cavity 11, fiber-containing material previously inserted into the cavity 13 is pressed with simultaneous pressure and temperature input. In this case, the fiber layer inserted into the cavity 13 can be compressed and thus pressed as soon as the forming tool 10 is closed. The final pressing is carried out when the forming tool 10 is completely closed.

The first tool component 12 and the second tool component 20 can each have a tool plate. In further embodiments, cavities 13 and mold parts 21 can be integrally installed on the mutually facing surfaces of the tool plates or can be detachably connected to the tool plates. In the case of a detachable connection, the cavities 13 and mold parts 21 can be fastened, for example, by means of screws. In such embodiments, at least one cavity 13 and/or mold part 21 can be replaced if, for example, a cavity 13/a mold part 21 is damaged, dirty or if replacement is necessary to manufacture other products.

The manufacture of products from a fiber-containing material takes place by inserting a suitable material, e.g. fiber material that includes exclusively natural fibers that have a relatively low moisture content. The water content can be, for example, 5 to 30 wt. %. Such fiber material can be introduced, for example, as a preformed preform made of a loose fiber composite (fluff pulp) or as individual fibers. In the following description, the fiber-containing material is generally referred to as fiber material. Such a fiber material can include different types of fibers.

Figure 2:
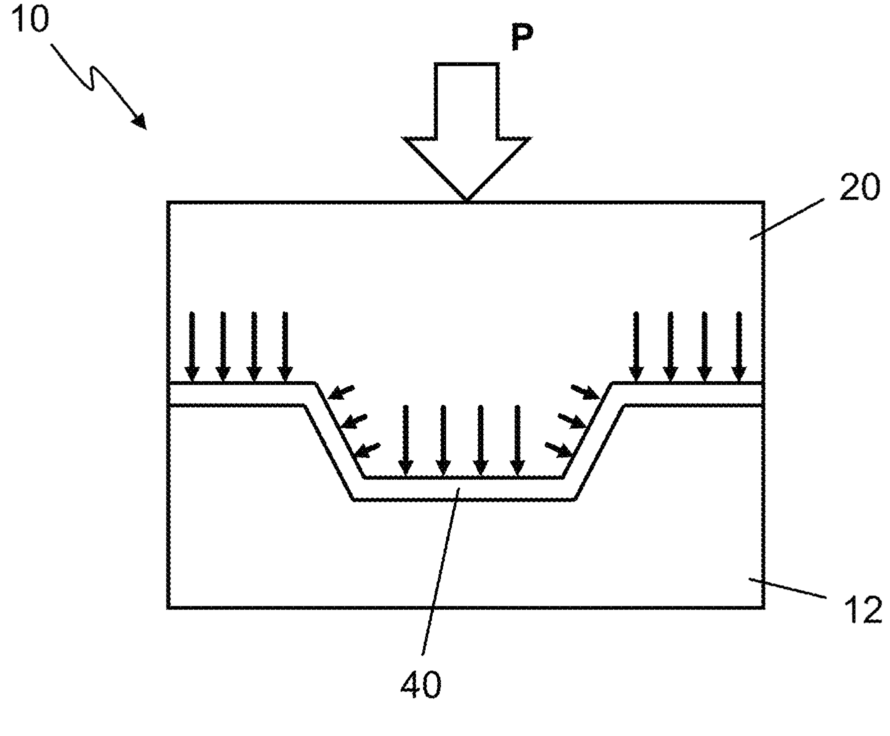
FIG. 2 depicts a schematic illustration of a forming tool for manufacturing products in an embodiment according to the prior art.

FIG. 2 shows a schematic illustration of a forming tool 10 for manufacturing products in an embodiment according to the prior art, after a fiber material has been inserted and the forming tool 10 has been closed. For the pressing, a pressure is applied to the forming tool 10 as shown schematically by the arrow P. In the embodiment shown, pressure is applied only from above via the second tool component 20. In further embodiments of the forming tools 10 described herein, pressure can also be applied from below via the first tool component alternatively or additionally. Due to the applied pressure, the fiber material in the mold cavity 11 is pressed by the relative displacement of the mold part 21 and the cavity 13. The pressure required to manufacture a product leads to a desired pressing in the areas extending orthogonally to the applied pressure P, since the pressure can act on these areas over their entire surface. In these areas, a finished product has the required strength after pressing because the fibers in these areas have been sufficiently compressed. In FIG. 2, this is shown by the arrows in the region of the mold bottom 18 and the edge areas running parallel to it, which have a greater length or height than the small arrows in the region of the slopes 16 and 24. However, in the region of the slopes 160 and 24, the pressing force cannot develop the required effect via the applied pressure, which decreases considerably depending on the design of the slopes 16 and 24. For example, in the case of particularly steep slopes 16 and 24, the vertically acting pressing force can only achieve very poor compression of the fibers of the fiber material, so that the finished product does not have sufficient strength after pressing, especially in the region of slopes.

Figure 3:
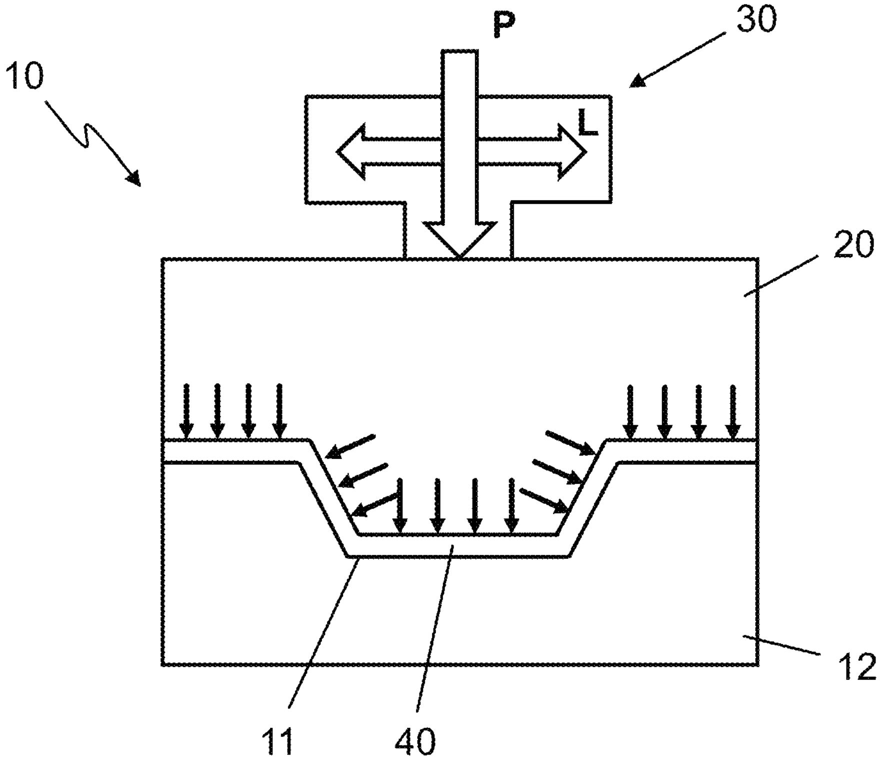
FIG. 3 depicts a schematic illustration of a forming tool after the insertion of a fiber material, with a device for introducing vibrations, according to some embodiments.

FIG. 3 shows a schematic illustration of a forming tool 10 after the insertion of a fiber material 40, with a device 30 for introducing vibrations according to the technical teaching disclosed herein, where a substantially uniform compression of inserted fiber material 40 is achieved over the entire surface, so that a finished product has a substantially uniform strength over the entire surface or product geometry.

The pressing and introduction of vibrations can be carried out substantially independently of the type of insertion of fiber material 40. For example, individual fibers and/or fiber bundles can be inserted—where fiber bundles have a relatively small number of fibers that are attached to one another and thus form a bundle. In further embodiments, a fiber material 40 can be inserted into the cavity 13 as a preform or fiber mat made of loose fibers. For example, a preform can already substantially have the geometry of the product to be manufactured. In contrast, a fiber mat and/or a portion of a fiber mat has no preformed portions or formations and can be inserted into a cavity 13. The fiber mat can be designed like a fleece and can adhere to the surface 14 of the cavity 13 due to its own weight. Both a preform and a fiber mat can have a relatively loose composite of individual fibers and/or fiber bundles. The fibers/fiber bundles can be obtained in further versions in a comminuting device, such as a mill, from e.g. paper, cardboard, fleece, plant fibers, etc. The fibers and/or a fiber mat/preform can have a moisture content of 0-60 wt. % water. In still further embodiments, the fibers and/or the fiber mats/preform have a moisture content of 5-40 wt. % of water. In still further embodiments, the fibers and/or the fiber mats/preform have a moisture content of 7-30 wt. % of water.

After the comminution in a comminuting device, individual fibers are present, which are in a length spectrum of a few micrometers to, for example, 6 mm depending on the material used. Depending on their length, the fibers have different properties. Thus, in principle, higher strengths can be achieved in products with long fibers; however, long fibers exhibit poor formability. That is to say, it is generally possible to achieve only a non-uniform distribution on the product surface with long fibers (e.g., in the range of 4 to 6 mm). In contrast, short fibers (1-2 mm) have a lower strength with good formability. The density of a finished product is decisively influenced by fines (fiber parts) with a length of less than 1 mm, the proportion of which is basically higher in the case of short fibers. Thus, higher compressions can be achieved with shorter fibers and/or fiber fractions, where the mechanical properties and barrier properties of a product can be influenced accordingly. A very dense fiber layer can be produced, for example. Overall, the properties of the product to be produced can thus also be influenced by the length of the fibers.

The fiber material 40 can further have additives that affect the mechanical properties and the barrier action. Depending on the composition of the fiber material 40, products may be biodegradable, and can themselves be used again as starting material for manufacturing products, such as a cup-like product (see mold in FIG. 3) made from a fiber material, and can be composted because they can generally be completely decomposed and do not contain any questionable, environmentally hazardous substances.

A product can in particular be a three-dimensional product, such as, for example, a cup, lid, bowl, capsule, plate, and further molded and/or packaging parts (for example, as holding/support structures for electronic or other devices).

To introduce vibrations, the upper second tool component 20 is connected to a device 30. In further embodiments, the lower first tool component 12 can alternatively or additionally be connected to a device 30. In still further embodiments, at least one second device 30 that introduces vibrations can also be provided on a first tool component 12 and/or second tool component 20.

The at least one device 30 performs lateral movements L, thereby generating vibrations with a frequency in the range of 500 to 50,000 Hz, ideally 5,000 to 30,000 Hz. The frequency of the vibrations can be modified during a pressing process.

During the manufacture of products, a pressure P is exerted via the forming tool 10 in at least one time period, and at the same time vibrations are introduced via the at least one device 30 perpendicular to the pressing direction (shown schematically by arrow P), so that the fiber material 40 and/or the fibers are repeatedly squeezed between the surfaces 14, 22 of the cavity 13 and the mold part 21, in particular in the region of the slopes 16, 24. As a result, the fiber material 40 and/or the product in the region of the slopes 16, 24 is also compressed, where the fiber material 40 is thus compressed to substantially the same extent over the entire surface of the product to be manufactured, as shown schematically by the arrows on the fiber material 40 in FIG. 3. The arrows have the same length as in FIG. 2, which illustrates the pressing effect on the surface of the fiber material 40. As shown, in FIG. 3 the pressing effect is substantially the same, whereas in FIG. 2 the pressing effect is sufficiently large only in the region of the surfaces running orthogonal to the pressing direction and is too small in the region of the slopes 16, 24.

The at least one device 30 can, for example, be connected directly to the first tool component 12 and/or the second tool component 20. The at least one device 30 can, for example, be screwed to the first tool component 12 and/or the second tool component 20 or be an integral part thereof. The at least one device 30 can be arranged centrally with respect to at least one cavity 13 and/or a tool component 12, 20. A single device 30 can be provided for all cavities 13 and/or mold parts 21. In further embodiments, a separate device 30 can be provided for each cavity 13 and/or mold part 21.

In embodiments with cavities 13 and mold parts 21, which can be connected to tool plates via screws, for example, the connection between the tool plates and the cavities 13 and mold parts 21 fastened thereto is designed such that vibrations introduced via the at least one device 30 are transmitted without damping.

The at least one device 30 can be designed, for example, as a vibrator or as an ultrasonic sonotrode that is operated electrically. The power of such a device 30 is to be determined according to the weight of the forming tool 10 to be moved and the size of the mold cavity 11, as well as the fiber material and the applied pressing force P. For this purpose, the power with which the vibrations are introduced can be approximately determined in advance. Devices 30 or vibrators may include a motor having at least one shaft with an imbalance. The rotation generates centrifugal forces which, for the application described here, can be in the range between 1,000 $N/cm^2$ and 10,000 $N/cm^2$ specific surface pressure.

Figure 4:
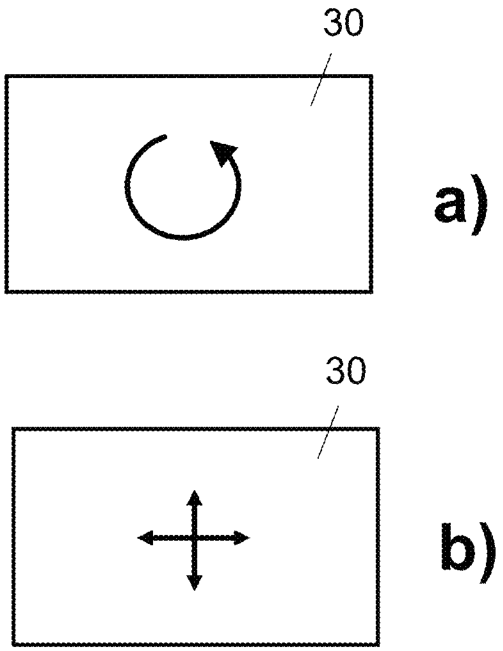
FIG. 4*a*), b) depict schematic illustrations of devices for introducing vibrations, according to some embodiments.

FIG. 4*a*), b) show schematic illustrations of devices 30 for introducing vibrations. Depending on the design of the at least one device 30 and its arrangement on a first tool component 12 and/or a second tool component 20, the vibrations can be introduced in a circular manner (FIG. 4*a*) or in a straight line (FIG. 4*b*). In the embodiments according to FIG. 4*b*), vibrations can be introduced both in one direction only and in directions orthogonal to each other.

The type of vibration introduction can depend significantly on the geometry of the product to be manufactured.

Figure 5:
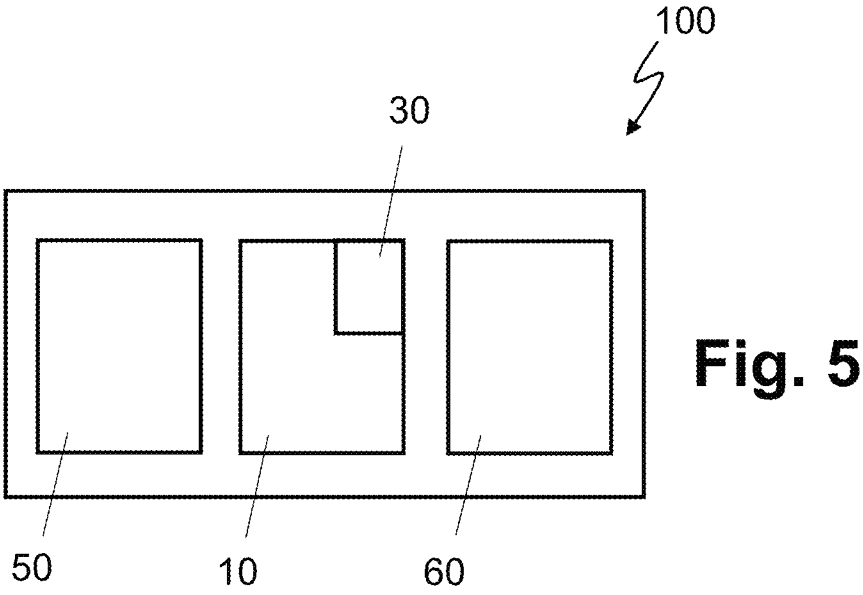
FIG. 5 depicts a schematic illustration of a molding plant for manufacturing products from a fiber material, according to some embodiments.

FIG. 5 shows a schematic illustration of a molding plant 100 for manufacturing products from a fiber material 40. The molding plant 100 has at least one controller 50, a feed device 60, and a forming tool 10. The forming tool 10 additionally has at least one device 30 via which vibrations are introduced into the forming tool 10. The controller 50 serves to control the processes and sequences of the molding plant 100, and is connected to the corresponding devices for this purpose. The controller 50 regulates the required energy and material conversion, and processes information and control commands for this purpose. The feed device 60 is used to feed fiber material between a first tool component 12 and a second tool component 20 of a forming tool 10, which has at least one cavity 13, and a corresponding mold part 21. In further embodiments, a molding plant 100 can have a forming tool 10 with a plurality of cavities 13 and corresponding mold parts 21.

The fiber material 40 can be inserted as a preform, as a fiber mat or as loose fiber material via the feed device 60 into at least one cavity 13 of at least one forming tool 10. In further embodiments, the fiber-containing material can be moistened in order to improve the bonding effect between the fibers of the fiber material 40 during the subsequent compressing. In yet further embodiments, a molding plant 100 can also have a preform station in which preforms are generated. For this purpose, in further embodiments, molding plants 100 can additionally or alternatively have a supply container for fiber material 40. Finally, a molding plant 100 can have an apparatus for removing and for further processing of molded products.

The manufactured product is then removed from the at least one cavity 13, and can be sent for further processing (coating, filling, sealing, printing, stacking, packaging, etc.).

Figure 6:
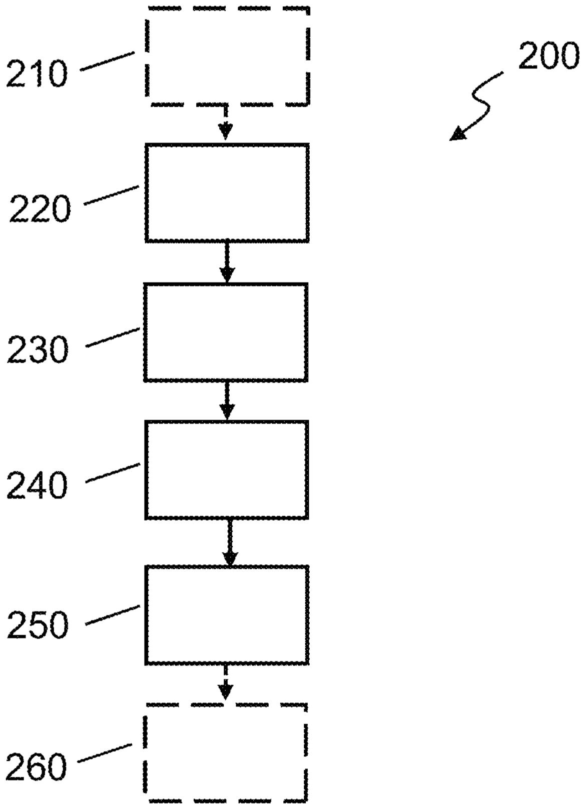
FIG. 6 depicts a method for manufacturing products from a fiber material, according to some embodiments.

FIG. 6 schematically shows a method 200 for manufacturing products from a fiber material. The manufacturing process can be carried out using a molding plant 100 as shown in FIG. 5. In further embodiments, the method 200 can be carried out using a forming tool 10 that has a different design than that shown in FIG. 3 and is part of a different design of a molding plant 100 than that shown in FIG. 5.

In an optional method step 210, fiber material 40 is provided. Depending on the type of material, the fiber material 40 can be provided in different ways. Thus, the provision can also include the production and/or processing of the fiber material 40.

In a subsequent method step 220, the fiber material 40 is inserted into at least one cavity 13 of at least one first tool component 12 of a forming tool 10. The fiber material 40 can be inserted as loose fibers/fiber bundles, as a fiber mat or as a preform. The insertion can be carried out using a feed device 60 of a molding plant 100.

After the introduction of the fiber material 40, the forming tool 10 is closed in a method step 230 by relative displacement of the at least one first tool component 12 and/or the at least one second tool component 20. During the closing, the fiber material 40 may be partially compressed.

In a method step 240, the fiber material 40 is pressed within the mold cavity 11 between the surface 14 of the cavity 13 and the surface 22 of the mold part 21. In a method step 250, vibrations are introduced by moving the at least one first tool component 12 and/or the at least one second tool component 20 perpendicular to the pressing direction during the pressing, where the vibrations are introduced by at least one device 30. Here, the fiber material 40 is pressed into the final product and the fibers are compressed within the mold cavity 11 in the region of the slopes 16, 24 by the vibrations.

During the pressing process, heat can be introduced and/or the fiber material 40 can be heated via the first tool component 12 and/or the second tool component 20, where the bonding of the fibers of the fiber material 40 is significantly influenced. For this purpose, the at least one cavity 13 and/or the at least one mold part 21 are preferably heated via heating elements arranged in a tool plate (e.g. electrically controllable heating cartridges), so that the surface 14 of the at least one cavity 13 and/or the surface 22 of the at least one mold part 21 have a surface temperature of 20 to 300° C., ideally 50 to 150° C.

The introduction of vibrations and the application of pressure during a pressing process can take place over different periods of time, and their intensity can be varied. In further embodiments, the time at which the pressing process begins and the time at which the introduction of vibrations begins may be different. For example, in other embodiments, vibrations can be introduced first and the pressing process can be started at a later time. In other embodiments, the pressing process begins before the introduction of vibrations. In other embodiments, the introduction of vibrations takes place simultaneously with the pressing process.

In still other embodiments, the pressing process or the introduction of vibrations can be terminated before the introduction of vibrations or the pressing process is terminated, respectively. In still other embodiments, the pressure during the pressing process and/or the duration and intensity of the vibrations during the pressing can be modified. For example, the introduction of vibrations can be increased with a continuously increasing pressure for pressing the fiber material 40, for which purpose the frequency of the vibrations is increased, for example. In further embodiments, for example, the centrifugal force of an excenter can be achieved by changing the speed of a shaft connected to the excenter. In other embodiments, however, both the pressing force and the intensity of the vibrations can decrease continuously (e.g. reduction of the frequency; reduction of the speed of an unbalanced shaft).

Further manufacturing and processing steps can be carried out in optionally provided process steps 260. These include, for example, coating, filling, closing, stacking, printing, packaging, quality control, etc.

The above sequence can then be repeated for at least one new product.

Advantageously, by introducing vibrations, the surface pressure on the entire surface of a forming tool 10 or the geometry of a product to be manufactured, even in the region of slopes 16, 24, can be substantially the same as in surfaces of the forming tool 10 aligned parallel to the pressing direction (e.g. mold bottom 18; mold part bottom 26), where the pressing direction does not run parallel to the slopes 16, 24. This achieves uniform strength across the entire surface of a product without the known disadvantages of the prior art. In particular, flexible tool components, which have disadvantages with regard to heat transfer, can be dispensed with. Furthermore, even with thin-walled products, consistent strength and identical properties can be achieved across the entire surface of a product.

LIST OF REFERENCE SIGNS

10 forming tool
11 mold cavity
12 first tool component
13 cavity
14 surface
16 slope
18 mold bottom
20 second tool component
21 mold part
22 surface
24 slope
26 mold part bottom
30 device
40 fiber material
50 controller
60 feed device
100 molding plant
200 method
210-260 method step

The invention claimed is:

1. A method for manufacturing three-dimensional products with at least one inclined product portion made of fibers, using at least one forming tool, wherein the at least one forming tool has at least one first tool component with at least one cavity and at least one second tool component with at least one mold part corresponding to the at least one cavity, wherein the at least one mold part and the at least one cavity are movable relative to one another to form a mold cavity between corresponding surfaces of the at least one cavity and the at least one mold part, the method comprising:

introducing the fibers into the at least one cavity of the at least one first tool component;

closing the at least one forming tool by relative displacement of the at least one first tool component and the at least one second tool component;

pressing the fibers within the mold cavity; and laterally moving the at least one first tool component and/or the at least one second tool component relative to a pressing direction during the pressing to introduce vibrations in the fibers.

2. The method according to claim 1, wherein the vibrations are introduced in the fibers perpendicular to the pressing direction.

3. The method according to claim 1, wherein the vibrations are introduced in the fibers in parallel to the pressing direction or in an optimized direction of action.

4. The method according to claim 1, wherein the vibrations are introduced in the fibers via the at least one mold part.

5. The method according to claim 1, wherein a frequency of the vibrations is modified during the pressing.

6. The method according to claim 1, wherein a duration of the vibrations and a duration of the pressing are different.

7. The method according to claim 1, wherein a pressure used for the pressing is modified during the pressing.

8. The method according to claim 1, wherein a frequency of the vibrations and/or a vibration duration are adapted to a pressure used for pressing.

9. The method according to claim 1, wherein laterally moving the at least one first tool component and/or the at least one second tool component relative to the pressing direction includes a linear or rotating movement.

10. The method according to claim 1, wherein the vibrations are introduced according to a product geometry specification of a product to be manufactured.

11. A forming tool for manufacturing three-dimensional products with at least one inclined product portion from fibers, comprising at least one first tool component with at least one cavity and at least one second tool component with at least one mold part corresponding to the at least one cavity, wherein the at least one mold part and the at least one cavity operable to be moved relative to one another to form a mold cavity between corresponding surfaces of the at least one cavity and the at least one mold part, and are operable to be pressed to press the fibers that is configured to be inserted into the mold cavity, the forming tool further comprising a device for laterally moving the at least one first tool component and/or the at least one second tool component perpendicular to a pressing direction during the pressing to introduce vibrations in the fibers.

* * * * *